(12) United States Patent
Hayashi et al.

(10) Patent No.: US 7,373,932 B2
(45) Date of Patent: May 20, 2008

(54) HEATING APPARATUS FOR LIQUEFIED GAS FUEL SUPPLY SYSTEM

(75) Inventors: Kenji Hayashi, Aichi (JP); Takao Komoda, Aichi (JP); Masanori Torii, Aichi (JP); Toshinari Saiki, Aichi (JP); Masayuki Kosaka, Aichi (JP); Toshimitsu Taguchi, Hyogo (JP)

(73) Assignee: Fujitsu Ten LImited, Hyogo (JP)

( * ) Notice: Subject to any disclaimer, the term of this patent is extended or adjusted under 35 U.S.C. 154(b) by 327 days.

(21) Appl. No.: 11/172,985

(22) Filed: Jul. 5, 2005

(65) Prior Publication Data

US 2006/0054145 A1 Mar. 16, 2006

(30) Foreign Application Priority Data

Jul. 2, 2004 (JP) .......................... P2004-197350

(51) Int. Cl.
*F02M 21/06* (2006.01)
*F02B 43/00* (2006.01)

(52) U.S. Cl. ...................... 123/549; 123/543; 123/552; 123/557; 123/527

(58) Field of Classification Search ................ 123/527, 123/549, 552, 557, 1 A; 137/341
See application file for complete search history.

(56) References Cited

U.S. PATENT DOCUMENTS

| 4,430,978 A | * | 2/1984 | Lewis et al. ................. 123/478 |
| 6,067,972 A | * | 5/2000 | Jaasma ........................ 123/549 |
| 2003/0216883 A1 | * | 11/2003 | Lee ............................. 702/136 |

FOREIGN PATENT DOCUMENTS

| JP | 06-239150 A | * | 8/1994 |
| JP | A 7-253051 | | 10/1995 |
| JP | A 2003-74841 | | 3/2003 |
| JP | A 2003-328859 | | 11/2003 |

\* cited by examiner

*Primary Examiner*—Stephen K. Cronin
*Assistant Examiner*—Ka Chun Leung
(74) *Attorney, Agent, or Firm*—Oliff & Berridge PLC

(57) ABSTRACT

A heating apparatus for a liquefied gas fuel supply system includes a heating unit, a detecting unit and a setting unit. The liquefied gas fuel supply system vaporizes liquefied gas fuel to supply the vaporized gas fuel to an internal-combustion engine. The heating unit heats the liquefied gas fuel before the liquefied gas fuel is vaporized. The detecting unit detects vapor pressure characteristic of the liquefied gas fuel. The setting unit sets an amount of heat to be applied to the liquefied gas fuel on a basis of a detection result by the detecting unit.

13 Claims, 6 Drawing Sheets

FIG. 4

| PROPANE RATIO (%) \ FUEL TEMPERATURE (°C) | t1 | t2 | t3 | t4 | t5 | t6 | t7 | t8 |
|---|---|---|---|---|---|---|---|---|
| prmin | a7 | a6 | a5 | a4 | a3 | a2 | a1 | 0 |
| pr1 | a6 | a5 | a4 | a3 | a2 | a1 | 0 | 0 |
| pr2 | a5 | a4 | a3 | a2 | a1 | 0 | 0 | 0 |
| pr3 | a4 | a3 | a2 | a1 | 0 | 0 | 0 | 0 |
| pr4 | a3 | a2 | a1 | 0 | 0 | 0 | 0 | 0 |
| prmax | a2 | a1 | 0 | 0 | 0 | 0 | 0 | 0 |

HEATING APPARATUS FOR LIQUEFIED GAS FUEL SUPPLY SYSTEM

BACKGROUND OF THE INVENTION

1. Field of the Invention

The present invention relates to a heating apparatus for a liquefied gas fuel supply system, for heating liquefied gas fuel when the fuel is vaporized to be supplied to an internal-combustion engine.

2. Description of the Related Art

As well known, an internal-combustion engine, which is provided in, for example, an automobile using a liquefied gas fuel such as liquefied petroleum gas (LPG) is designed to vaporize in a vaporizer the fuel stored under a high pressure and to use the vaporized fuel for combustion. The vaporizer is cooled by latent heat of vaporization of the fuel. When the vaporizer is excessively cooled, the fuel undergoes insufficient vaporization, which has adverse influence on fuel injection control, etc.

Conventionally, in order to prevent such an excessive cooling, JP 2003-328859 A discloses a system for heating fuel in which a heating apparatus introduces engine cooling water into a vaporizer, and is provided with an electric heater in the vaporizer to heat the fuel by means of both heat of the engine cooling water heated in the engine and heat generated from the electric heater.

SUMMARY OF THE INVENTION

The liquefied gas fuel has such a characteristic that a saturated vapor pressure is dependent on component and the temperature. Therefore, liquefied gas fuel having a high saturated vapor pressure and another one having low saturated vapor pressure are different in an amount of heat required to vaporize the same quantity of fuel. Specifically, for example, a large amount of heat is required to vaporize the fuel having the low saturated vapor pressure, while a small amount of heat is required to vaporize the fuel having the high saturated vapor pressure.

Thus, for example, when an applied amount of heat is insufficient, there is a possibility that the fuel is insufficiently vaporized so as to have adverse influence on fuel injection control etc. To the contrary, when an applied amount of heat is excessive, there is possibility that the fuel vaporized generates gas at excessive pressure, or the resulting energy is uselessly, which causes a problem in the aspect of energy efficiency. In particular, when the heat of the engine cooling water can not be used in heating the fuel, for example when a cold engine is started, there is no alternative but to generate by the electric heater the whole quantity of heat required to heat the fuel. This useless energy consumption is significant.

In this manner, the supply system of the liquefied gas fuel involves the problems set forth above due to the difference in component or temperature of the fuel. Accordingly, the point in question is open to further improvement.

In view of these circumstances, the invention has been made. The invention provides a heating apparatus for a liquefied gas fuel supply system, being capable of properly vaporizing fuel without excess or deficiency.

According to one embodiment of the invention, a heating apparatus for a liquefied gas fuel supply system includes a heating unit, a detecting unit and a setting unit. The liquefied gas fuel supply system vaporizes liquefied gas fuel to supply the vaporized gas fuel to an internal-combustion engine. The heating unit heats the liquefied gas fuel before the liquefied gas fuel is vaporized. The detecting unit detects vapor pressure characteristic of the liquefied gas fuel. The setting unit sets an amount of heat to be applied to the liquefied gas fuel on a basis of a detection result by the detecting unit.

According to this structure, the amount of applied heat can be set in response to the vapor pressure characteristic of the liquefied gas fuel. Therefore, in comparison with a case where the amount of applied heat is constant, the saturated vapor pressure of the fuel can be changed toward a target value with high precision in accordance with a component and/or temperature of the fuel, so that it is possible to vaporize the fuel in a proper manner.

Further, the vapor pressure characteristic of the liquefied gas fuel is determined on the basis of the relation between the temperature of the fuel and the saturated vapor pressure of the fuel. Thus, if the fuel has the same component, those fuel represent the same tendency. In other words, in the invention, the 'vapor pressure characteristic' is determined on the basis of either the relation between the temperature of the liquefied gas fuel and the saturated vapor pressure of the liquefied gas fuel or determined on the basis of components of the fuel.

From this view point, instead of the components of the fuel, the detecting unit may detect a temperature of the liquefied gas fuel and a saturated vapor pressure of the liquefied gas fuel simultaneously as the vapor pressure characteristic of the liquefied gas fuel.

According to one embodiment of the invention, the liquefied gas fuel may include liquefied petroleum gas. The detecting unit may detect a propane ratio of the liquefied petroleum gas as the vapor pressure characteristic of the liquefied gas fuel.

In spite of the same temperature, the fuel has different saturated vapor pressure depending on its component. In the invention, when setting the amount of heat to be applied to the liquefied gas fuel, a propane ratio that is one of component indices of the liquefied gas fuel (here, the liquefied petroleum gas) is referred. Therefore, it is possible to consider variations of the vapor pressure characteristic caused by a difference of the fuel component. Furthermore, it is possible to change the saturated vapor pressure toward a target value with high precision.

According to one embodiment of the invention, the setting unit may set the amount of heat to be applied to the liquefied gas fuel on a basis of the detection result by the detecting unit and a temperature of the liquefied gas fuel detected in a vaporizer that vaporizes the liquefied gas fuel.

According to this structure, the temperature of the fuel vaporized in the vaporizer is referred. Therefore, a difference between the temperature of the vaporized fuel and the temperature of the fuel at a time when the saturated vapor pressure of the fuel reaches the target value becomes clear, so that a precision of setting the amount of heat to be applied to the fuel is improved.

According to one embodiment of the invention, the heating unit may include an electric heater that heats the liquefied gas fuel. The setting unit may set a heating period for which the electric heater applies the set amount of heat to the liquefied gas fuel.

According to one embodiment of the invention, the heating unit may include a heat exchanger and an electric heater. The heat exchanger uses heat of engine cooling water. The setting unit may set the amount of heat to be applied to the liquefied gas fuel by the electric heater on a basis of (a) the detection result by the detecting unit and (b) a lower one of a temperature of the engine cooling water detected in the heat exchanger and a temperature of the engine cooling water detected in a cooling water circulating system of the internal-combustion engine.

Generally, the internal-combustion engine has a heat capacity greater than the heat exchanger. Even if engine cooling water in the heat exchanger is once detected to have a temperature higher than that in the internal-combustion engine, circulation of the engine cooling water causes the engine cooling water in the heat exchanger to be lowered to the same temperature as that in the internal-combustion engine. In other words, even if the engine cooling water in the heat exchanger is detected to have a temperature higher than that in the internal-combustion engine, there is a possibility that if the amount of heat to be applied to the fuel by the electric heater is set on the basis of the detected temperature, vaporization may be insufficient. This problem becomes more serious, for example, as a cycle of the detection gets longer.

In general, the internal-combustion engine has a heat capacity greater than the heat exchanger. Even if engine cooling water in the heat exchanger is detected to have the temperature higher than that in the internal-combustion engine, circulation of the engine cooling water causes the engine cooling water in the heat exchanger to be lowered to the same temperature as that in the internal-combustion engine. In other words, even if the engine cooling water in the heat exchanger is detected to have the temperature higher than that in the internal-combustion engine, there is a possibility that, when the heating amount of the fuel by the electric heater is set on the basis of the detected temperature, vaporization is insufficient. This problem becomes more serious, for example, as a cycle of the detection gets longer.

For that reason, in the structure described above, the value of the lower one of the engine water temperature and the heat exchanger water temperature is adopted as the fuel temperature referred to in the map, and the amount of heat to be applied to the fuel by the electric heater is set on the basis of the adopted value. Therefore, even if the cycle of the detection is long, a shortage of an amount of heat generated in the electric heater can be avoided.

In addition, since the electric heater is provided, it is possible to heat the liquefied gas fuel when a cold engine is started.

According to one embodiment of the invention, the heating unit may use at least heat of engine cooling water to heat the liquefied gas fuel. When a temperature of the engine cooling water detected in the internal-combustion engine is equal to or less than a predetermined threshold value, the setting unit may allow the heating unit to use the heat of the engine cooling water to heat the liquefied gas fuel. When the temperature of the engine cooling water detected in the internal-combustion engine is higher than the predetermined threshold value, the setting unit may stop the heating unit heating the liquefied gas fuel and changes the predetermined threshold value in accordance with the detection result by the detecting unit.

According to this structure, when the temperature of the engine cooling water in the internal-combustion engine is higher than the predetermined threshold value, the liquefied gas fuel is no longer heated, and thereby excessive vaporization is inhibited. The threshold value is changed depending on the vapor pressure characteristic of the liquefied gas fuel detected by the detecting unit, so that it is possible to more properly vaporize the fuel.

BRIEF DESCRIPTION OF THE DRAWINGS

FIG. 4 is a map used in calculating a pre-heat period.

DETAILED DESCRIPTION OF THE EMBODIMENTS

Hereinafter, a heating apparatus according to one embodiment of the invention in a liquefied gas fuel supply system of an internal-combustion engine for automobile use will be described with reference to FIGS. 1 to 7. Further, in the liquefied gas fuel supply system of this embodiment, liquefied petroleum gas (LPG) is supplied as a fuel to the internal-combustion engine.

Figure 1:
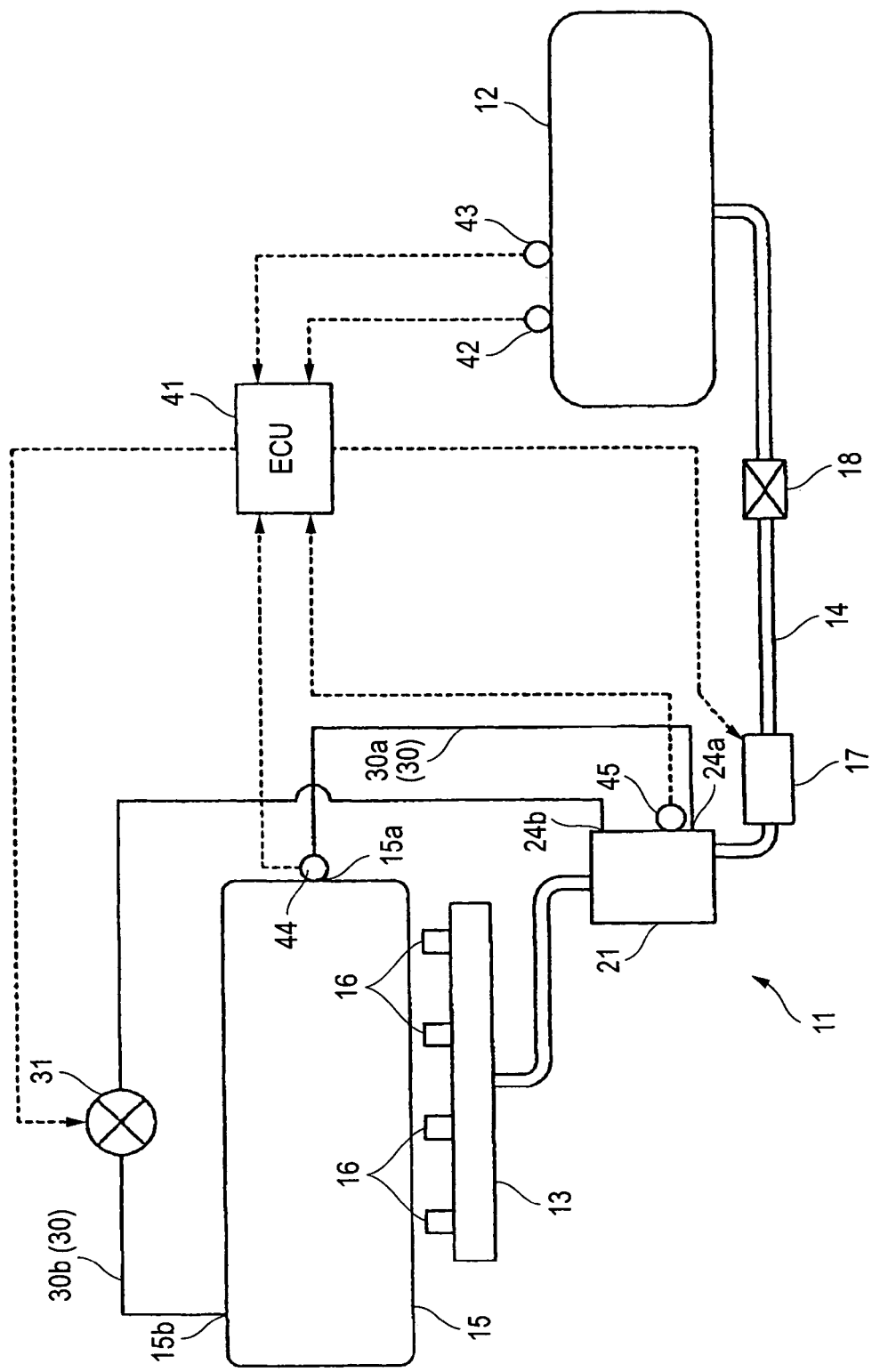
FIG. 1 is a conceptual configuration diagram showing a heating apparatus for a liquefied gas fuel supply system according to one embodiment.

As shown in FIG. 1, a liquefied gas fuel supply system 11 includes a fuel tank 12, a delivery pipe 13, and a fuel passage 14 that supplies fuel in the fuel tank 12 to the delivery pipe 13. The delivery pipe 13 is provided with a plurality of injectors 16 that inject the fuel into respective combustion chamber (not shown) of an internal-combustion engine 15. These injectors 16 are actually mounted on the internal-combustion engine 15. However, for the sake of convenience, these injectors 16 are shown to be separated from the internal-combustion engine 15 in the drawing.

The fuel is hermetically stored in the fuel tank 12 in a saturated state. The fuel passage 14 is provided with a regulator 21 therein. The regulator 21 adjusts a pressure of the fuel supplied to the delivery pipe 13 and vaporizes the fuel. The fuel delivered from the fuel tank 12 in a liquid state is not only adjusted in pressure but also vaporized by the regulator 21. In other words, the regulator 21 serves as a vaporizer.

Meanwhile, the regulator 21 is cooled by latent heat of vaporization accompanied with the vaporization of the fuel. This latent heat of vaporization cools the regulator 21 as well as the fuel in the regulator 21. Here, when this cooling is excessive, the fuel is insufficiently vaporized, which has adverse influence on fuel injection control.

For this reason, in the embodiment, a heating unit that heats the fuel is disposed to prevent such excessive cooling. The heating unit may include a PTC heater 17 that heats the fuel supplied to the regulator 21 and a heat exchanger that heats the fuel in the regulator 21.

The PTC heater 17 is disposed in the fuel passage 14 on an upstream side of the regulator 21, i.e. on the side of the fuel tank 12. The PTC heater 17 is a kind of electric heater, which has a heating element increased in electric resistance depending on increase of the temperature. This heating element causes the PTC heater 17 to be maintained at a temperature at which an amount of heat radiated from the heating element is in equilibrium with an amount of power consumption at the heating element in a state where a constant voltage is applied. Thus, the PTC heater 17 can control an amount of generated heat by means of adjustment of its energization period (on condition that a voltage is constant) The PTC heater 17 is used in heating the fuel, for example, when an engine is started.

Further, an open and close valve 18 capable of shutting off a flow of the fuel is disposed on the upstream side of the PTC heater 17 on the fuel passage 14.

Further, in the embodiment, a circulation passage 30 for circulating engine cooling water is provided between the inside of the regulator 21 and the inside of the internal-combustion engine 15. When the engine cooling water circulates through the circulation passage 30 between the inside of the regulator 21 and the inside of the internal-combustion engine 15, heat of the engine cooling water heated by heat of the internal-combustion engine 15 is transferred to the regulator 21 so as to heat the fuel in the regulator 21.

The circulation passage 30 includes a first passage 30a that connects an outlet 15a (not shown) of a cooling water passage formed in the internal-combustion engine 15 with a water introduction port 24a of the heat exchanger provided in the regulator 21, and a second passage 30b that connects a water discharge port 24b of the heat exchanger with an inlet 15b of the cooling water passage in the internal-combustion engine 15.

Furthermore, the cooling water passage of the internal-combustion engine 15 includes a water jacket formed in the internal-combustion engine 15. In other words, the circulation passage 30 share a part of the cooling water circulation system of the internal-combustion engine 15, which includes a radiator and so on. In the circulation passage 30, a circulation flow of the engine cooling water is generated by driving a water pump (not shown) that is provided in the internal-combustion engine 15. And the water pump is coupled to a crank shaft of the internal-combustion engine 15, and is driven as far as the internal-combustion engine 15 is in operation.

The circulation passage 30 is provided with a circulation shut-off valve 31 therein. The circulation shut-off valve 31 is capable of shutting off the circulation passage 30. When the circulation shut-off valve 31 is closed, circulation in the circulation passage 30, i.e. heat exchange between the internal-combustion engine 15 and the regulator 21, is stopped. Meanwhile, the drawing illustrates an example where the circulation shut-off valve 31 is provided on the second passage 30b. However, the invention is not limited thereto. For example, the circulation shut-off valve 31 may be provided on the first passage 30a.

Figure 2:
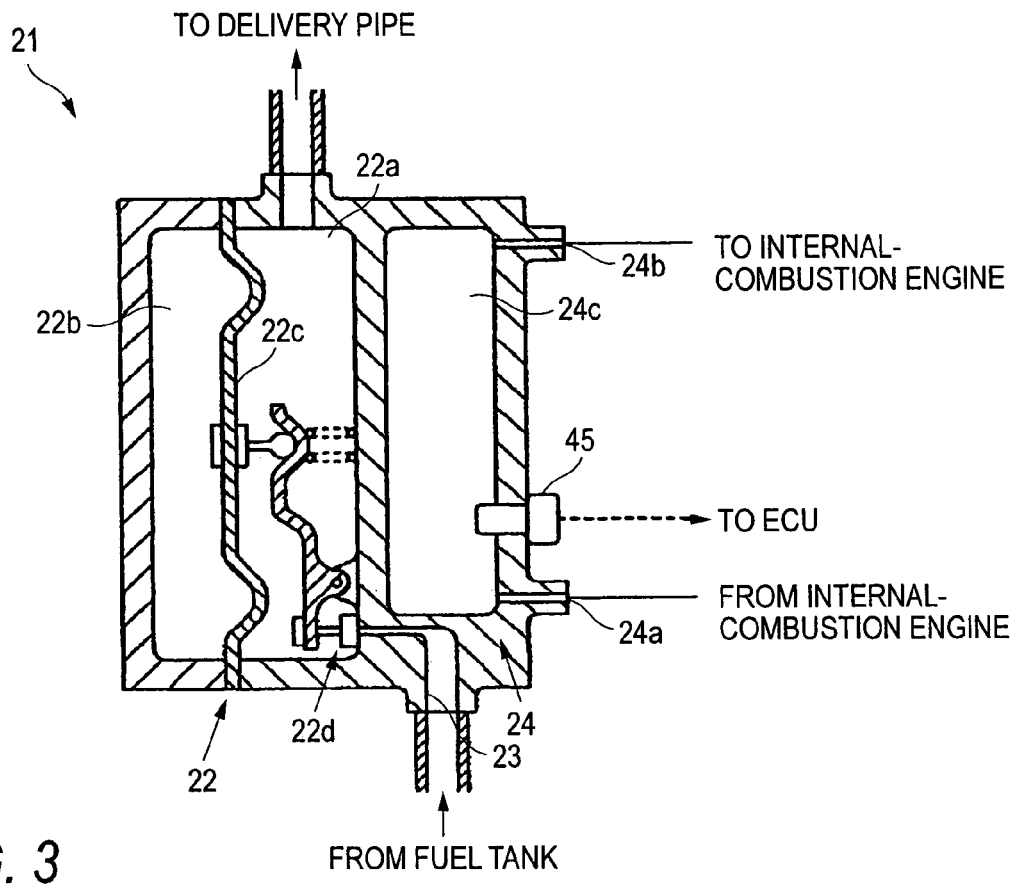
FIG. 2 is an enlarged section view of a regulator.

Now, the regulator 21 of the embodiment, which includes the heat exchanger, will be described with reference to FIG. 2.

The regulator 21 has a pressure adjusting mechanism 22 for adjusting pressure of the fuel. The pressure adjusting mechanism 22 is formed of a diaphragm type mechanism, and includes a pressure reduction member 22c that divides the pressure adjusting mechanism 22 into a pressure reduction chamber 22a where the fuel is subject to pressure reduction and an atmospheric pressure chamber 22b where an atmospheric pressure is introduced. In the pressure adjusting mechanism 22, an amount of the fuel introduced into the pressure reduction chamber 22a is adjusted by open and close operation of a pressure adjusting valve 22d, which is caused by displacement of the pressure reduction member 22c on the basis of a pressure balance of the chambers 22a and 22b.

Specifically, the regulator 21 is provided with an internal passage 23 that introduces the fuel from the fuel tank 14 into the pressure reduction chamber 22a through the pressure adjusting valve 22d. The pressure adjusting valve 22d opens or closes an outlet of the internal passage 23, thereby adjusting an amount of the fuel. This adjustment of an amount of the fuel is made so that an internal pressure of the pressure reduction chamber 22a becomes a value (target pressure) higher than that (atmospheric pressure) of the atmospheric pressure chamber 22b by a predetermined value on the basis of the displacement of the pressure reduction member 22c. That is, when the internal pressure of the pressure reduction chamber 22a is higher than the target pressure, the pressure adjusting valve 22d opens smaller than before, and thus an amount of the fuel to be vaporized is decreased, so that the internal pressure of the pressure reduction chamber 22a is decreased. By contrast, when the internal pressure of the pressure reduction chamber 22a is lower than the target pressure, the pressure adjusting valve 22d opens bigger than before, and thus an amount of the fuel to be vaporized is increased, so that the internal pressure of the pressure reduction chamber 22a is increased.

Further, as described above, the regulator 21 has the heat exchanger 24. The heat exchanger 24 is provided with an engine cooling water chamber 24c that communicates with the water introduction port 24a and the water discharge port 24b. The engine cooling water chamber 24c is disposed adjacent to the internal passage 23, and is configured to perform heat exchange between the engine cooling water introduced into the engine cooling water chamber 24c through the water introduction port 24a and the fuel in the internal passage 23.

With regard to this heating unit, the following description will be made about a control system of the heating apparatus, for controlling an amount of heat to be applied to the fuel so as to properly vaporize the fuel without excessive or deficiency.

As shown in FIG. 1 together, the control system of the heating apparatus is constructed around an ECU (Electronic Control Unit) 41. The ECU 41 controls an amount of heat to be applied to the fuel as well as controls an operation of the internal-combustion engine 15 such as control of an injection amount or injection time of the fuel by controlling the injectors 16, and.

The ECU 41 is configured as an arithmetic-logic operation circuit, which includes CPU (Central Processing Unit), RAM (Random Access Memory), ROM (Read Only Memory) or the like, and has ports for inputting/outputting a signal from/to external devices. The ECU 41 has an input port into which detected signals from, for example, a tank fuel temperature sensor 42, a tank fuel pressure sensor 43, an engine water temperature sensor 44, and a heat exchanger water temperature sensor 45 as well as a crank angle sensor and an intake pressure sensor are input.

The tank fuel temperature sensor 42 detects a temperature (vapor temperature) of the fuel in the fuel tank 12. The tank fuel pressure sensor 43 detects a vapor pressure in the fuel tank 12. Moreover, in the embodiment, because the fuel is stored in the fuel tank 12 in a saturated state, the vapor pressure, which detected by the tank fuel pressure sensor 43, is a saturated vapor pressure.

The engine water temperature sensor 44 is provided in the circulation passage 30, particularly at the outlet 15a of the internal-combustion engine 15. The engine water temperature sensor 44 detects a temperature of the engine cooling water (hereinafter, referred to as 'engine water temperature') in the internal-combustion engine 15. The heat exchanger water temperature sensor 45 detects a temperature of the engine cooling water (hereinafter, referred to as 'heat exchanger water temperature') in the engine cooling water chamber 24c of the heat exchanger 24.

In the meanwhile, the ECU 41 has output ports to which a signal line for the PTC heater 17 and a signal line for the circulation shut-off valve 31 are connected, and a command signal toward the PTC heater 17 and a command signal for the circulation shut-off valve 31 is output from the output port.

The ECU 41 constructed as described above controls the an amount of heat to be applied to the fuel by the PTC heater 17 and that by the heat exchanger 24 through energization control with respect to the PTC heater 17 and the circulation shut-off valve 31.

Further, in the embodiment, LPG is adopted as the fuel of the internal-combustion engine 15. LPG mainly consists of a mixed gas of propane and butane. Generally, in the case of the LPG, there are variations in a mixing ratio of propane to butane, that is, a component ratio of propane to butane, so that LPG has variations in the saturated vapor pressure at the same temperature.

Figure 3:
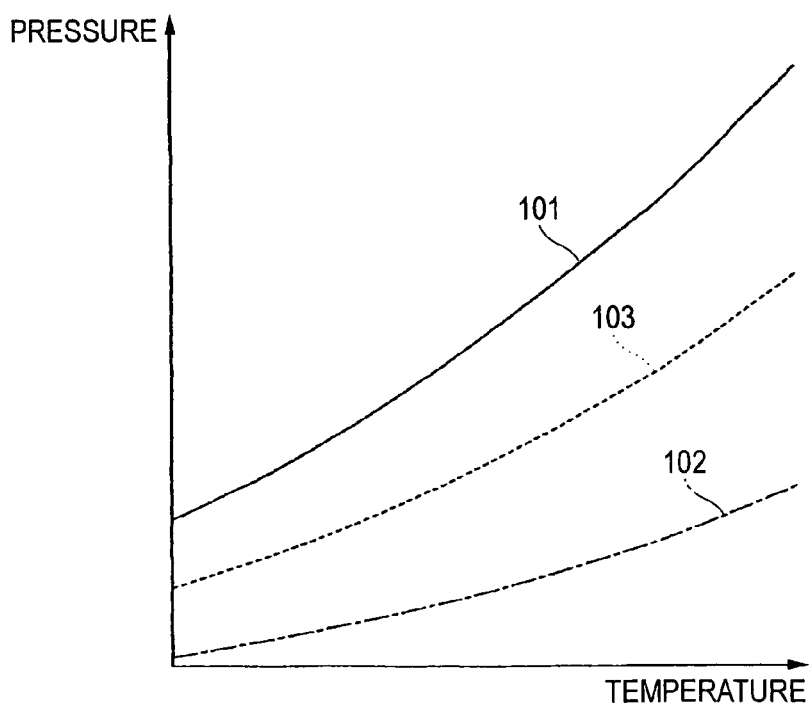
FIG. 3 is a graph showing relationship between temperatures and pressures of fuel.

FIG. 3 is a curve (vapor pressure curve) showing the relationship between the saturated vapor pressures and the temperatures of propane and butane. In FIG. 3, a curve 101 plotted with a solid line is a vapor pressure curve for propane, and another curve 102 plotted with a one-dot chain line is a vapor pressure curve for butane. In this manner, the vapor pressure curve shows a tendency peculiar to each component of the fuel, i.e., propane or butane.

In general, among the components of the LPG, components other than propane and butane is infinitesimal. As such, the other components are considered to have little influence on a characteristic of vapor pressure of the LPG. With regard to the LPG, when a ratio of propane to butane, furthermore a proportion (ratio of propane), which propane has among the components of the LPG, can be specified, the vapor pressure curve of the LPG can be determined. For example, when the propane ratio is 100%, the vapor pressure curve of the LPG is similar to the curve 101. To the contrary, when the propane ratio is 0% (or the butane ratio is 100%), the vapor pressure curve of the LPG is similar to the curve 102. Further, when the propane ratio is 50%, the vapor pressure curve of the LPG shows a medium characteristic between the curve 101 and the curve 102, and for example, is similar to the curve 103 plotted with a broken line in FIG. 3. In other words, the vapor pressure curve of the LPG shows a tendency to get more similar to the curve 101 as the propane ratio becomes higher, as well as to get more similar to the curve 102 as the propane ratio becomes lower.

In this manner, in the case of the LPG, when the propane ratio is specified, the vapor pressure curve, namely the saturated vapor pressure at a certain temperature can be specified. Further, conversely speaking, when the temperature of the LPG and the saturated vapor pressure at that temperature are specified, the propane ratio can be specified. In this respect, the component proportion such as the propane ratio or the temperature of the LPG and the saturated vapor pressure at that temperature may be considered as one of the 'vapor pressure characteristics' specifying the vapor pressure curve of the LPG.

As mentioned above, the saturated vapor pressure varies due to a difference of this component proportion as well as the temperatures of the fuel. Thus, in the fuel supply system of this embodiment where the liquefied gas fuel is vaporized and supplied to the internal-combustion engine 15, a vaporized state varies due to the difference in the fuel temperatures as well as the difference in the component proportion. For this reason, in the case of heating the fuel by means of the heating unit, in order to properly vaporize fuel in the fuel supply system without excess and deficiency, it is effective to reflect the component proportion to setting of an amount of applied heat.

In this respect, the embodiment is adapted to reflect the propane ratio, for example, to the setting of an amount of heating applied to the fuel when the engine is started.

In other words, prior to setting an amount of applied heat, the ECU 41 computes the propane ratio of the LPG on the basis of signals detected from the tank fuel temperature sensor 42 and tank fuel pressure sensor 43. In the ECU 41, data concerning the vapor pressure curve of the LPG is previously stored while being associated with various propane ratios, and the propane ratios suitable for the respective detected signals (detection results of the vapor temperature and saturated vapor pressure in the fuel tank 12) are computed on the basis of the data. Further, the data concerning the vapor pressure curve, which are stored in the ECU 41 may be those capable of determining the propane ratio from the relation between the vapor temperature and the saturated vapor pressure in the fuel tank 12, for example, data in which a map for relation between the vapor temperatures and the saturated vapor pressures for each propane ratio.

When the propane ratios are computed in this manner, it is possible to determine the vapor pressure curve of the fuel used in the fuel supply system 11. Thus, a fuel temperature at a time when the saturated vapor pressure of the vaporized fuel becomes a certain value can be determined by use of the data concerning the vapor pressure curve. In other words, a temperature at a time when the saturated vapor pressure of the fuel becomes a target value can be determined. Therefore, if the pressure value (saturated vapor pressure) at a time when an amount of the vaporized fuel becomes a certain value is set as a 'target value of the saturated vapor pressure', the fuel is heated to match with the fuel temperature corresponding to the target value of the saturated vapor pressure, and thereby the fuel can be properly vaporized without excess and deficiency.

On the basis of this principle, the embodiment sets an amount of heat to be applied to the fuel, which is necessary and sufficient for an amount of the vaporized fuel to reach the target amount, from the propane ratio and the detected temperature of the fuel in the regulator 21. The fuel is heated by the set amount, thereby making the temperature of the fuel in the regulator 21 be temperature corresponding to the target amount (target amount of the vaporized fuel).

With regard to setting of the amount of applied heat, the embodiment sets the amount of heat to be applied to the fuel by the PTC heater 17 on the basis of the map shown in FIG. 4. As described above, the PTC heater 17 is maintained at a temperature at which an amount of heat radiated from the heating element is in equilibrium with an amount of power consumption at the heating element in a state where a constant voltage is applied. For this reason, the embodiment sets the amount of applied heat by setting the energization period (heating period) of the PTC heater 17, which is in correlation with the amount of heat to be applied to the fuel. Accordingly, in the embodiment, the heating period of the fuel by the PTC heater 17 is obtained from the propane ratio and the temperature of the fuel by use of the map of FIG. 4.

Further, in the embodiment, a lower one of the engine water temperature detected by the engine water temperature sensor 44 and the heat exchanger water temperature detected by the heat exchanger water temperature sensor 45 is adopted as the fuel temperature, which is referred to in setting the heating period by use of the map. Namely, when an amount of heat to be applied to the fuel is set, the ECU 41 compares the engine water temperature and the heat exchanger water temperature, and then applies a value of the lower one of the compared temperatures to the map as the fuel temperature, thereby obtaining the heating period corresponding to the propane ratio.

Generally, the internal-combustion engine 15 has a heat capacity greater than the heat exchanger 24. Even if engine cooling water in the heat exchanger 24 is once detected to have a temperature higher than that in the internal-combustion engine 15, circulation of the engine cooling water causes the engine cooling water in the heat exchanger 24 to be lowered to the same temperature as that in the internal-combustion engine 15. In other words, even if the engine cooling water in the heat exchanger 24 is detected to have a temperature higher than that in the internal-combustion engine 15, there is a possibility that if the amount of heat to be applied to the fuel by the PTC heater 17 is set on the basis of the detected temperature, vaporization may be insufficient. This problem becomes more serious, for example, as a cycle of the detection gets longer.

For that reason, in the embodiment, the value of the lower one of the engine water temperature and the heat exchanger water temperature is adopted as the fuel temperature referred to in the map, and the amount of heat to be applied to the fuel by the PTC heater 17 is set on the basis of the adopted value. Therefore, even if the cycle of the detection is long, a shortage of an amount of heat generated in the PTC heater 17 can be avoided.

Further, in the map, symbols prmin, pr1, . . . , pr4 and prmax each represent the propane ratio (%) as an algebraic number. The symbols have such a magnitude relationship that the ratio gets higher from the minimum value prmin to the maximum value prmax (the ratio gets higher as a number following 'pr' gets greater).

Furthermore, in the map, symbols t1, t2, t3, . . . , t7 and t8 each represent, as an algebraic number, the fuel temperature, namely the lower one of the detected values of the engine water temperature and the heat exchanger water temperature. The symbols have such a magnitude relationship that the temperature gets higher from the minimum value t1 to the maximum value t8 (the temperature gets higher as a number following 't' gets greater).

In addition, in the map, symbols a1, a2, a3, . . . , a6 and a7 each represent, as an algebraic number, the heating period, namely the energization period of the PTC heater 17. The symbols have such a magnitude relationship that the period gets longer from the minimum value a1 to the maximum value a7 (the period gets longer as a number following 'a' gets greater).

In brief, in the map, with regard to the same ratio of propane, as the fuel temperature get higher, the heating period becomes shorter (In other words, a small heating amount is sufficient). Further, with regard to the same fuel temperature, as the propane ratio gets higher (i.e., goes downward in the map), the heating period becomes shorter. In addition, when the fuel temperature reaches the maximum value t8 in the map, the heating period is set to '0' for all the values from prmin to prmax regardless of the high and low propane ratio (In this case, the heating by the PTC heater 17 is not required).

Figure 5:
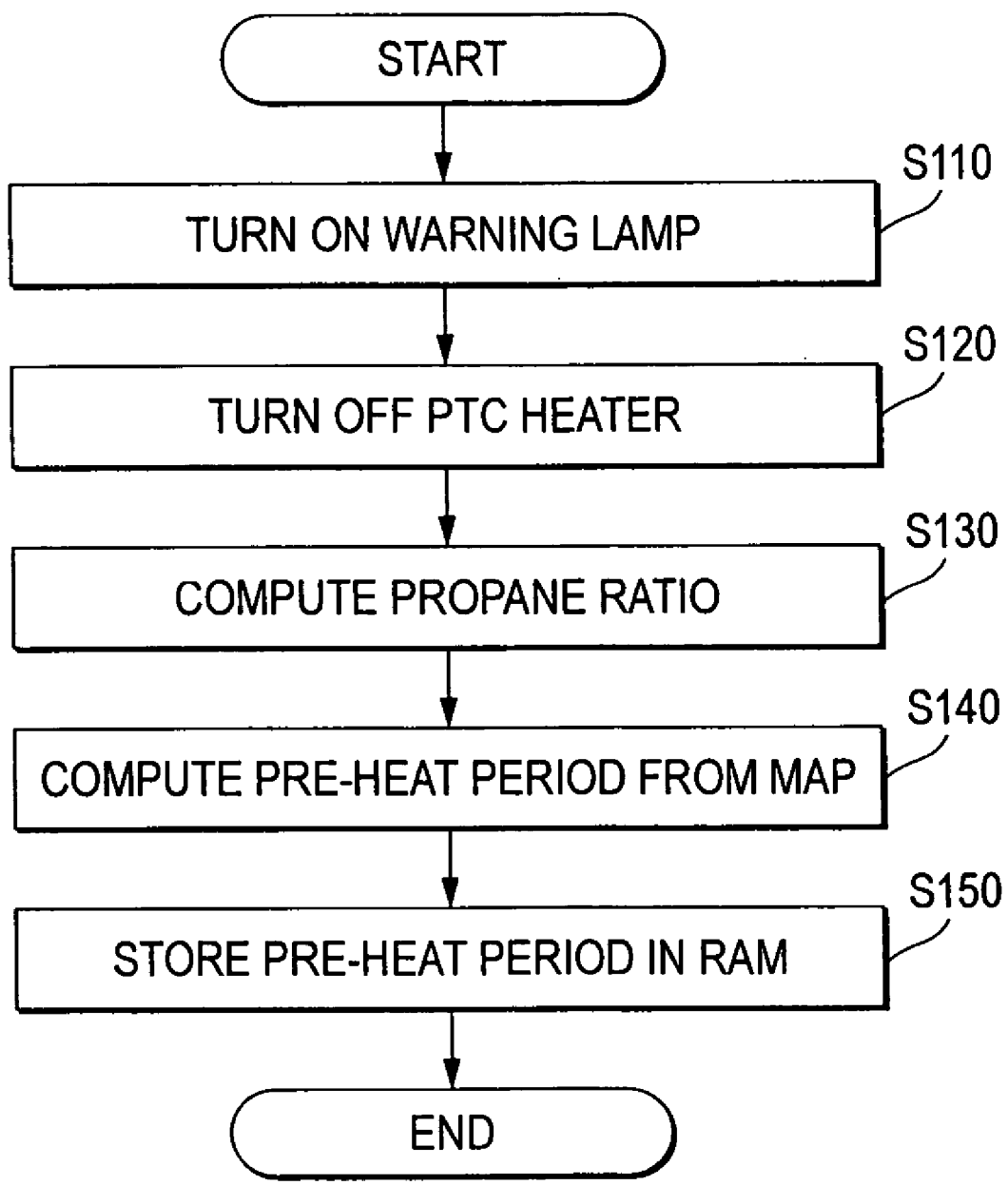
FIG. 5 is a flowchart for explaining a process for setting the pre-heat period.
Figure 6:
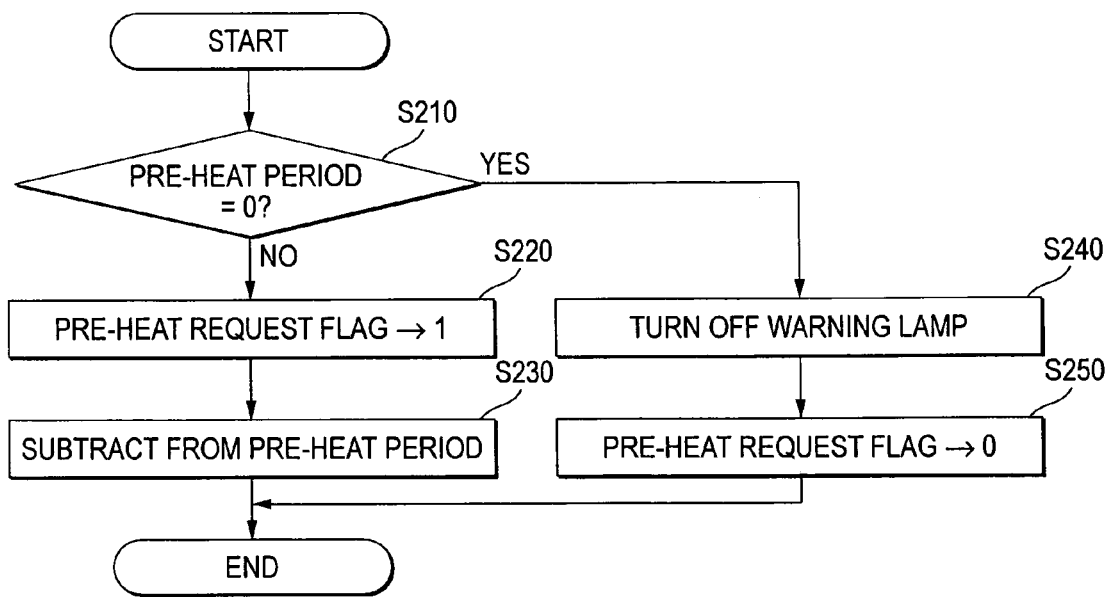
FIG. 6 is a flowchart for explaining a process for setting a pre-heat request flag.
Figure 7:
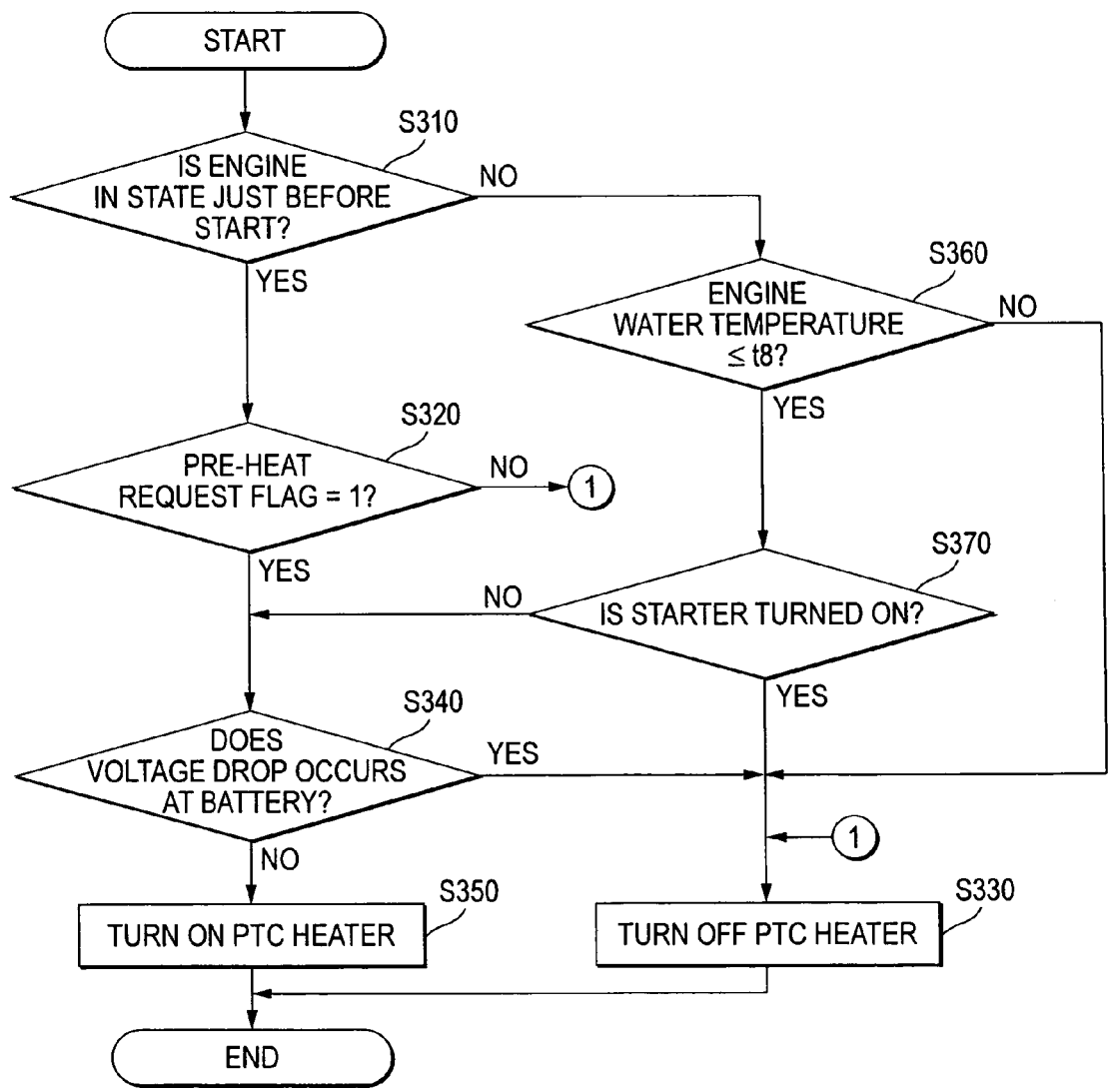
FIG. 7 is a flowchart for explaining a process for performing pre-heat.

Next, more detailed description will be given on controlling heating of the fuel in this embodiment, such as setting an amount of applied heat, with reference to FIGS. 5 to 7. Flowcharts of FIGS. 5 to 7 each show a processing routine of the control, which is executed by the ECU 41. Further, the processing routine shown in FIG. 5 is executed only once, when an ignition switch of a vehicle equipped with the internal-combustion engine 15 is turned on (i.e., the ignition switch is switched from OFF to ON). The processing routines of FIGS. 6 and 7 are each executed periodically at every predetermined period. Further, the processing routines of FIGS. 5 to 7 are each executed when only the ignition switch is in an ON state (including when an engine starter motor (not shown) for starting the internal-combustion engine 15 is driven).

First, when the ignition switch is turned on, a warning lamp (not shown) is turned on (step S110). The warning lamp notifies a driver of the vehicle of a standby state in which the internal-combustion engine 15 is not started (i.e., without driving the engine starter motor). For the purpose of initialization, the PTC heater 17 is made to be in an OFF state (in an energization stop state) (step S120), and then a propane ratio is computed (step S130). The propane ratio is computed in the same sequence as described above. Specifically, the propane ratio is computed on the basis of the detection results of the tank combustion temperature sensor 42 and the tank pressure sensor 43.

Further, on the basis of the map shown in FIG. 4, a period (hereinafter, referred to as 'pre-heat period') for generating heat from the PTC heater 17 at a time when the engine is started is computed (step S140). In this case, a lower one of an engine water temperature detected by the engine water temperature sensor 44 and a heat exchanger water temperature detected by the heat exchanger water temperature sensor 45 is selected as the temperature of the fuel vaporized in the regulator 21 (for example, the temperature of the fuel around the outlet of the internal passage 23). The pre-heat period is computed from the selected fuel temperature and the propane ratio computed in step S130, with using the map. This computed pre-heat period is stored in the RAM of the ECU 41 (step S150). Then, when step S150 is completed, the process proceeds to the processing routine of FIG. 6.

In the processing routine shown in FIG. 6, first, it is determined as to whether or not a value of the pre-heat period stored in the RAM is '0' (step S210). If the value is not '0' (step 210: NO), it is required to generate heat in the PTC heater 17, and thus a value of a pre-heat request flag is set to '1 (pre-heat request exists)' (step S220). Then, a predetermined value is subtracted from the value of the pre-heat period stored in the RAM, that is, the remaining period in which the pre-heat has to be performed is approached '0' (step S230).

Meanwhile, if a result of determining in step 210 is YES, or if the value of the pre-heat period stored in the RAM is '0', the warning lamp is turned off (step S240), and then the value of the pre-heat request flag is set to '0' (pre-heat request does not exist) (step S250). In this case, it is not required to generate heat in the PTC heater 17, and thus the driver is prompted to start the internal-combustion engine 15.

Further, when step S250 or step S230 is completed, the process proceeds to the processing routine of FIG. 7. In this processing routine, first, it is determined as to whether or not the internal-combustion engine 15 is on the verge of being started (step S310). In this embodiment, when the ignition switch is in the ON state and an engine speed is '0', that is, the internal-combustion engine 15 is in a stopped state, it is determined that 'the internal-combustion engine 15 is on the verge of being started (in a state just before the start)'. Further, as described above, because the processing routine is executed only when the ignition switch is in the ON state, the determination in step S310 is substantially made depending on the determination as to whether the internal-combustion engine 15 is in the operation state or in the stopped state. Then, if it is determined that the internal-combustion engine 15 is in the state just before the start (step S310: YES), it is determined as to whether or not the value of the pre-heat request flag set in the processing routine of FIG. 6 is '1', namely 'pre-heat request exists' (step S320).

If the pre-heat request does not exist (step S320: NO), the PTC heater 17 undergoes no energization (step S330). That is, the fuel is not heated by the PTC heater 17. Step S330 is executed, for example when the pre-heat period computed in step S140 is '0' or the computed pre-heat period is expired.

In contrast, if the pre-heat request exists (step S320: YES), it is determined as to whether or not voltage drop occurs at a battery (not shown) that supplies power to the PTC heater 17 (step S340). If it is determined that the voltage drop occurs at the battery (step S340: YES), the PTC heater 17 is made in a non-energization state so as to reduce a load of the battery (step S330). In contrast, if it is determined that the voltage drop does not occur at the battery (step S340: NO), the battery has sufficient electric power accumulated, and thus the PTC heater 17 undergoes the energization (step S350). In other words, the fuel is heated by the PTC heater 17.

Further, in the processing routine, if the determination in step S310 is NO, namely if it is determined that the internal-combustion engine 15 is not in the state just before the start, the internal-combustion engine 15 is already in the operation state. Thus, it is determined as to whether or not an engine water temperature (a detection result by the engine water temperature sensor 44) is equal to or less than a fuel temperature t8 (i.e., equal to or under t8) in the map (step S360). If it is determined that the engine water temperature is higher than the fuel temperature t8 (step S360: NO), a water temperature in the engine cooling water chamber 24c of the heat exchanger 24 is already in a high state such that the heating by the PTC heater 17 is not required even when the propane ratio is the minimum value prmin. Thus, the process proceeds to step S330. Consequently, the PTC heater 17 becomes in the OFF state without undergoing the energization. Thereby, excessive vaporization is inhibited at the regulator 21, and simultaneously unnecessary energy consumption is avoided.

In the embodiment, when the determination in step S360 is NO, the circulation shut-off valve 31 is made to be in a close state so that the engine cooling water is no longer circulated into the circulation passage 30. Thereby, excessive heat change in the heat exchanger 24 that promotes vaporization of the fuel is inhibited, and furthermore the excessive vaporization is inhibited.

In contrast, if it is determined that a detection result of the engine water temperature sensor 44 is less than the fuel temperature t8 (step S360: YES), it is determined as to whether or not the engine starter motor is in operation (i.e., in an ON state). If the engine starter motor is in operation (step S370: YES), the PTC heater 17 is in the non-energization state so as to reduce a load of the battery (step S330). In contrast, if the engine starter motor is in operation (step S370: NO), the process proceeds to step S340. Then, it is determined as to whether or not the voltage drop occurs at the battery.

Further, in the embodiment, whenever the processing routine of FIG. 7 is repeatedly executed predetermined times, the process returns to the processing routine of FIG. 6. Also, whenever the processing routine of FIG. 6 is completed, the processing routine of FIG. 7 is repeatedly executed predetermined times, and then the process returns to the processing routine of FIG. 6 again. Such a control cycle continues to be repeated until the ignition switch is turned off.

Further, in the above-described configuration, the tank fuel temperature sensor 42 and the tank fuel pressure sensor 43 serve as a 'detecting unit' that detects vapor pressure characteristic of the fuel. Also, the ECU 41 serves as a 'setting unit' that sets an amount of heat to be applied to the fuel on a basis of the detection result by the detecting unit.

In the embodiment, the following effects can be achieved.

(1) Since an amount of heat to be applied to fuel is set on the basis of the detection result by the tank fuel temperature sensor 42 and/or the tank fuel pressure sensor 43, the amount of applied heat can be set on the basis of the vapor pressure characteristic of the fuel. Therefore, as compared with the case where, for example, a amount of applied heat is constant, the saturated vapor pressure of the fuel can be varied toward the target value with higher precision in response to the component and/or temperature of the fuel. Thus, the fuel can be properly vaporized without excess or deficiency.

(2) The propane ratio in the fuel is obtained from the detection results by the tank combustion temperature sensor 42 and the tank pressure sensor 43, and the amount of heat to be applied to the fuel is set on the basis of the obtained propane ratio.

Even if temperatures of fuel are the same, but components of the fuel are different, the saturated vapor pressures of the fuel are different. In the embodiment, since an amount of heat to be applied to the fuel is set with reference to the propane ratio, which is one of component indices of the LPG, it is possible to consider variation of the vapor pressure characteristic caused by difference in the fuel component. Furthermore, it is possible to vary the saturated vapor pressure of the fuel toward the target value with higher precision.

(3) An amount of heat to be applied to the fuel is set on the basis of the temperature of the fuel in the regulator 21 together with the propane ratio. In this manner, since the temperature of the fuel vaporized in the regulator 21 is referred to, the difference between a temperature of the fuel in the regulator 21 and a temperature of the fuel at a time when the saturated vapor pressure of the fuel is equal to the target value becomes clear. For this reason, precision of setting the amount of heat to be applied to the fuel by the PTC heater is improved.

(4) An amount of heat to be applied to the fuel is adjusted by varying the heating period by the PTC heater 17. Thereby, it is possible to simplify a mode of adjusting the amount of applied heat, for example, by not controlling (a magnitude of) current supplied to the PTC heater 17.

(5) In the embodiment, with regard to the engine cooling water, an amount of heat to be applied to the fuel by the PTC heater 17 is set on the basis of the lower one of the temperature (heat exchanger water temperature) detected in the heat exchanger 24 and the temperature (engine water temperature) detected in the cooling water circulation system of the internal-combustion engine 15. Thereby, for example, insufficient heating of the fuel can be avoided, which may be caused by cooling of the heat exchanger 24 due to the circulation of the engine cooling water after the temperature of the engine cooling water in the heat exchanger 24 is detected to be higher than that of the internal-combustion engine 15.

Further, the embodiment is not limited to the foregoing, but it may be implemented as the following aspect.

In the embodiment, when the determination in step S360 is NO in the processing routine, the circulation shut-off valve 31 is made in the close state. Thereby, the engine cooling water is no longer circulated in the circulation passage 30. For example, instead of this, an electric motor-driven pump may provided in the circulation passage 30. The electric motor-driven pump may be stopped in response to commands from the ECU 41. Thereby the engine cooling water may be no longer circulated. However, in this case, in order to properly stop circulation of the engine cooling water in the circulation passage 30, for example, the above-mentioned water pump serving as a source of generating a circulation flow in the circulation passage 30, is preferably replaced by the electric motor-driven pump.

In the embodiment, a fixed value t8 shown in the step S360 of the processing routine is adopted as a threshold value of the engine water temperature when the circulation in the circulation passage 30 stops. However, the invention is not limited thereto. For example, the threshold value may be changed in accordance with the propane ratio of the LPG. In this case, when the propane ratio is high, the threshold value is set to be low.

In the embodiment, an amount of heat to be applied to the fuel is set with reference to the lower one of the detection results of the engine water temperature sensor 44 and the heat exchanger water temperature sensor 45. However, the invention is not limited thereto. For example, the referring detection result may be fixed to any one of the detection results by the engine water temperature sensor 44 and the heat exchanger water temperature sensor 45. For another example, an average value of the two detection results by the engine water temperature sensor 44 and the heat exchanger water temperature sensor 45 may be referred.

The 'fuel temperature' referred in the map of FIG. 4 is not limited to fuel temperature in the regulator 21. Fuel temperature detected at another portion on the circulation passage 30 may be adopted. Even in this case, the setting precision can be improved, as compared with a mode where the fuel temperature is not referred when setting an amount of heat to be applied to the fuel.

In the embodiment, when an amount of heat to be applied to the fuel is set, the propane ratio is specified. However, the amount of heat to be applied to the fuel may be set without specifying the propane ratio. As one example, an almost desirable vapor pressure curve may be estimated by a statistical technique on the basis of the detection results by the tank fuel temperature sensor 42 and the tank fuel pressure sensor 43. Then, the fuel temperature corresponding to a target saturated vapor pressure may be computed from the vapor pressure curve.

In the embodiment, the temperature and vapor pressure (saturated vapor pressure) in the fuel tank 12 is detected in order to detect the vapor pressure characteristic of the fuel. However, the invention is not limited thereto. For example, if it is possible to detect the temperature of the fuel and the saturated vapor pressure of the fuel at that temperature, they may be detected at another place in the fuel system. For example, it is relatively easy to maintain a vapor pressure of the fuel at the saturated vapor pressure at portions from the fuel tank 12 to the regulator 21 on the fuel passage 14, it may be relatively easy to maintain the vapor pressure of the fuel as the saturated vapor pressure, and pressure variation occurring in the delivery pipe 13 hardly affects on those portions. Therefore, those portions are suitable position where a stable saturated vapor pressure is detected.

In the embodiment, the temperature of the fuel and the saturated vapor pressure of the fuel are detected as the vapor pressure characteristic. However, the invention is not limited thereto. For example, the components of the fuel may be specified through composition analysis based on a gas chromatograph, thereby detecting the vapor pressure characteristic.

In the embodiment, an amount of heat to be applied to the fuel is adjusted by changing the energization period of the PTC heater 17. However, the invention is not limited thereto. For example, the amount of heat to be applied to the fuel may be adjusted by changing the temperature of an electric heater when generating heat.

As described above, the set amount of heat to be applied to the fuel may be corrected, for example, on the basis of a flow of the fuel at a portion between the fuel tank 12 and the pressure adjusting valve 22d of the regulator 21 on the fuel passage 14. In this case, the correction is made in such a way that the amount of applied heat is increased when the fuel flow is large, while the amount of applied heat is decreased when the fuel flow is small.

In the embodiment, the LPG is adopted as the liquefied gas fuel. However, the invention is not limited thereto. For example, compressed natural gas (CNG), liquefied natural gas (LNG), dimethylether (DME), hydrogen or the like may be adopted. With using such liquefied gas fuel, the saturated vapor pressure of the liquefied gas fuel can be changed toward the a target value with higher precision, for example, while reflecting influence of content of impurities.

In the embodiment, the PTC heater 17 and the heat exchanger 24 are adopted as objects to which the setting unit sets an amount of heat to be applied to the fuel. However, one of them may be adopted as the setting object.

What is claimed is:

1. A heating apparatus for a liquefied gas fuel supply system that vaporizes liquefied gas fuel to supply the vaporized gas fuel to an internal-combustion engine, the heating apparatus comprising:
   a heating unit that heats the liquefied gas fuel before the liquefied gas fuel is vaporized;
   a detecting unit that detects vapor pressure characteristics of the liquefied gas fuel,
      wherein the detecting unit detects a temperature of the liquefied gas fuel and a saturated vapor pressure of the liquefied gas fuel simultaneously; and
   a setting unit that sets an amount of heat to be applied to the liquefied gas fuel on a basis of a detection result by the detecting unit.

2. The heating apparatus according to claim 1, wherein:
   the heating unit comprises an electric heater that heats the liquefied gas fuel; and
   the setting unit sets a heating period for which the electric heater applies the set amount of heat to the liquefied gas fuel.

3. The heating apparatus according to claim 1, wherein:
   the heating unit uses at least heat of engine cooling water to heat the liquefied gas fuel;
   when a temperature of the engine cooling water detected in the internal-combustion engine is equal to or less than a predetermined threshold value, the setting unit allows the heating unit to use the heat of the engine cooling water to heat the liquefied gas fuel; and
   when the temperature of the engine cooling water detected in the internal-combustion engine is higher than the predetermined threshold value, the setting unit stops the heating unit heating the liquefied gas fuel and changes the predetermined threshold value in accordance with the detection result by the detecting unit.

4. A heating apparatus for a liquefied gas fuel supply system that vaporizes liquefied gas fuel to supply the vaporized gas fuel to an internal-combustion engine, the heating apparatus comprising:
- a heating unit that heats the liquefied gas fuel before the liquefied gas fuel is vaporized, wherein the liquefied gas fuel includes petroleum gas;
- a detecting unit that detects vapor pressure characteristic of the liquefied gas fuel, wherein the detecting unit detects a propane ratio of the liquefied petroleum gas; and
- a setting unit that sets an amount of heat to be applied to the liquefied gas fuel on a basis of a detection result by the detecting unit.

5. The heating apparatus according to claim 4, wherein:
the heating unit comprises an electric heater that heats the liquefied gas fuel; and
the setting unit sets a heating period for which the electric heater applies the set amount of heat to the liquefied gas fuel.

6. The heating apparatus according to claim 4, wherein:
the heating unit uses at least heat of engine cooling water to heat the liquefied gas fuel;
when a temperature of the engine cooling water detected in the internal-combustion engine is equal to or less than a predetermined threshold value, the setting unit allows the heating unit to use the heat of the engine cooling water to heat the liquefied gas fuel; and
when the temperature of the engine cooling water detected in the internal-combustion engine is higher than the predetermined threshold value, the setting unit stops the heating unit heating the liquefied gas fuel and changes the predetermined threshold value in accordance with the detection result by the detecting unit.

7. A heating apparatus for a liquefied gas fuel supply system that vaporizes liquefied gas fuel to supply the vaporized gas fuel to an internal-combustion engine, the heating apparatus comprising:
- a heating unit that heats the liquefied gas fuel before the liquefied gas fuel is vaporized;
- a detecting unit that detects vapor pressure characteristic of the liquefied gas fuel; and
- a setting unit that sets an amount of heat to be applied to the liquefied gas fuel on a basis of a detection result by the detecting unit,
  wherein the setting unit sets the amount of heat to be applied to the liquefied gas fuel on a basis of the detection result by the detecting unit and a temperature of the liquefied gas fuel detected in a vaporizer that vaporizes the liquefied gas fuel.

8. The heating apparatus according to claim 7, wherein:
the heating unit comprises an electric heater that heats the liquefied gas fuel; and
the setting unit sets a heating period for which the electric heater applies the set amount of heat to the liquefied gas fuel.

9. The heating apparatus according to claim 7, wherein:
the heating unit uses at least heat of engine cooling water to heat the liquefied gas fuel;
when a temperature of the engine cooling water detected in the internal-combustion engine is equal to or less than a predetermined threshold value, the setting unit allows the heating unit to use the heat of the engine cooling water to heat the liquefied gas fuel; and
when the temperature of the engine cooling water detected in the internal-combustion engine is higher than the predetermined threshold value, the setting unit stops the heating unit heating the liquefied gas fuel and changes the predetermined threshold value in accordance with the detection result by the detecting unit.

10. A heating apparatus for a liquefied gas fuel supply system that vaporizes liquefied gas fuel to supply the vaporized gas fuel to an internal-combustion engine, the heating apparatus comprising:
- a heating unit, which includes an electric heater and a heat exchanger capable of using heat of engine cooling water, heats the liquefied gas fuel before the liquefied gas fuel is vaporized;
- a detecting unit that detects vapor pressure characteristic of the liquefied gas fuel; and
- a setting unit that sets an amount of heat to be applied to the liquefied gas fuel on a basis of a detection result by the detecting unit,
  wherein the setting unit sets the amount of heat to be applied to the liquefied gas fuel by the electric heater on a basis of (a) the detection result by the detecting unit and (b) a lower one of a temperature of the engine cooling water detected in the heat exchanger and a temperature of the engine cooling water detected in a cooling water circulating system of the internal-combustion engine.

11. The heating apparatus according to claim 10, wherein:
the setting unit sets a heating period for which the heating unit applies the set amount of heat to the liquefied gas fuel.

12. The heating apparatus according to claim 10, wherein:
the setting unit sets a heating period for which the electric heater applies the set amount of heat to the liquefied gas fuel.

13. The heating apparatus according to claim 10, wherein:
when a temperature of the engine cooling water detected in the internal-combustion engine is equal to or less than a predetermined threshold value, the setting unit allows the heating unit to use the heat of the engine cooling water to heat the liquefied gas fuel; and
when the temperature of the engine cooling water detected in the internal-combustion engine is higher than the predetermined threshold value, the setting unit stops the heating unit heating the liquefied gas fuel and changes the predetermined threshold value in accordance with the detection result by the detecting unit.

* * * * *